July 1, 1958  B. FARLEY  2,840,929
MEANS FOR OPERATING DELVERS
Filed Feb. 18, 1955  2 Sheets-Sheet 1

INVENTOR
BRIAN FARLEY
ATTORNEY

July 1, 1958 — B. FARLEY — 2,840,929
MEANS FOR OPERATING DELVERS
Filed Feb. 18, 1955 — 2 Sheets-Sheet 2

INVENTOR
BRIAN FARLEY
ATTORNEY

United States Patent Office 2,840,929
Patented July 1, 1958

2,840,929

MEANS FOR OPERATING DELVERS

Brian Farley, Yenda, New South Wales, Australia

Application February 18, 1955, Serial No. 489,167

Claims priority, application Australia March 3, 1954

2 Claims. (Cl. 37—98)

This invention relates to improvements in means for hydraulically operating a tractor drawn delver remotely from said tractor, thus obviating the need for providing an operator upon the delver.

The present invention simplifies the operation of a tractor-drawn delver having a moldboard hinged to a main beam at the front end thereof and having a wheel mounted upon an axle carried by an axle frame hingedly attached to the said beam and is characterised by a lever system controlled hydraulically by a ram served by the usual pump carried upon the said tractor whereby the delver may be tilted from its elevated travelling position upon its wheel, to its working position with its wheel raised.

In order that the invention may be more readily understood, reference will now be made to the accompanying drawings wherein.

Figure 3:
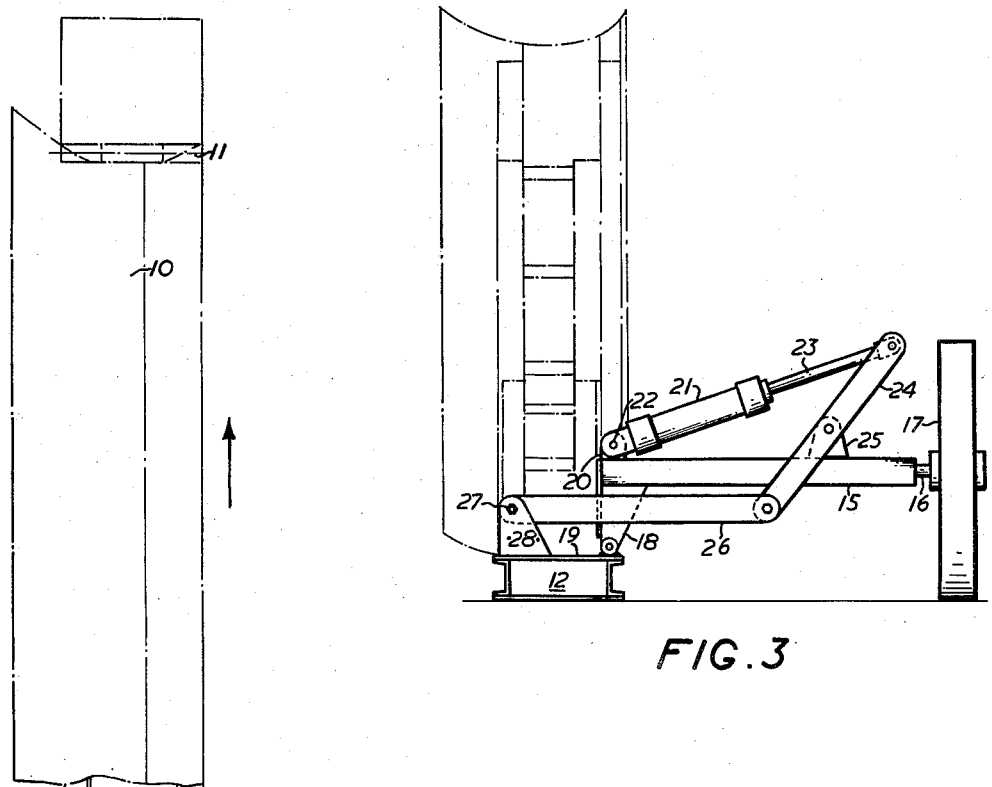
Figure 3 is a diagrammatic rear view corresponding to Figure 1 illustrating the inoperative travelling position of the delver.

The moldboard 10 of the delver to which the present invention is applicable, is connected by a hinge 11 to the main beam 12 and is adjustably connected thereto by members 13 and adjustable strut 14, having holes 9 to receive a suitable draw pin (not shown).

An axle frame 15 for supporting an axle 16 carrying a wheel 17 extends from hinge members 18 pivoted to respective front and rear bracket lugs 19 which latter are secured to the main beam 12.

The wheel 17 is mounted upon the outer end of the said axle 16; and the said axle frame 15 by means of the respective hinge members 18 provides means whereby the said wheel 17 together with its axle 16 may be raised and lowered radially with respect to the said beam 12.

A ram cylinder 21 is pivotally connected to a lug 20 on the axle frame adjacent the hinge member 18 of the rear bracket lug 19 by a pivot pin 22 and the plunger rod 23 of the ram cylinder 21 is pivotally coupled at its outer end to levers 24 which are medially pivoted on a fulcrum 25 secured to the axle frame 15.

The said levers 24 are pivotally connected at their lower ends to respective connecting links 26 which at their inner ends are connected by pivots 27 to respective extension members 28 of the rear bracket lug 19.

Figure 1:
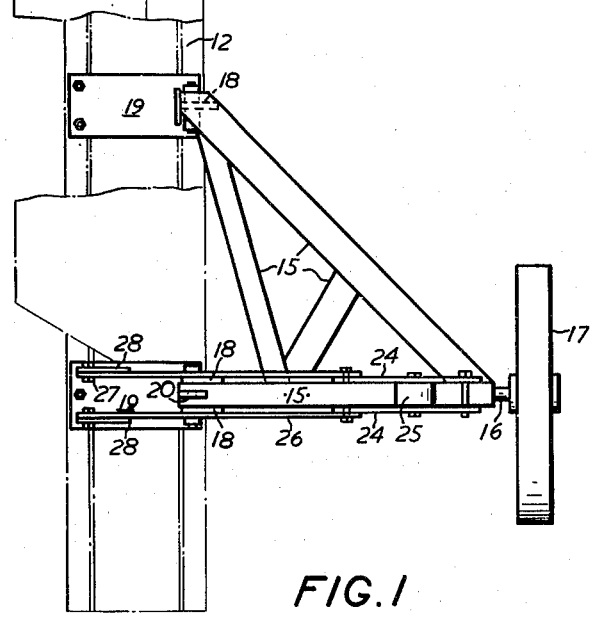
Figure 1 is a plan view illustrating diagrammatically a delver, in the inoperative travelling position and in which the present invention has been incorporated, the arrow indicating the direction of travel of the delver, the operating ram having been omitted.
Figures 2, 4:
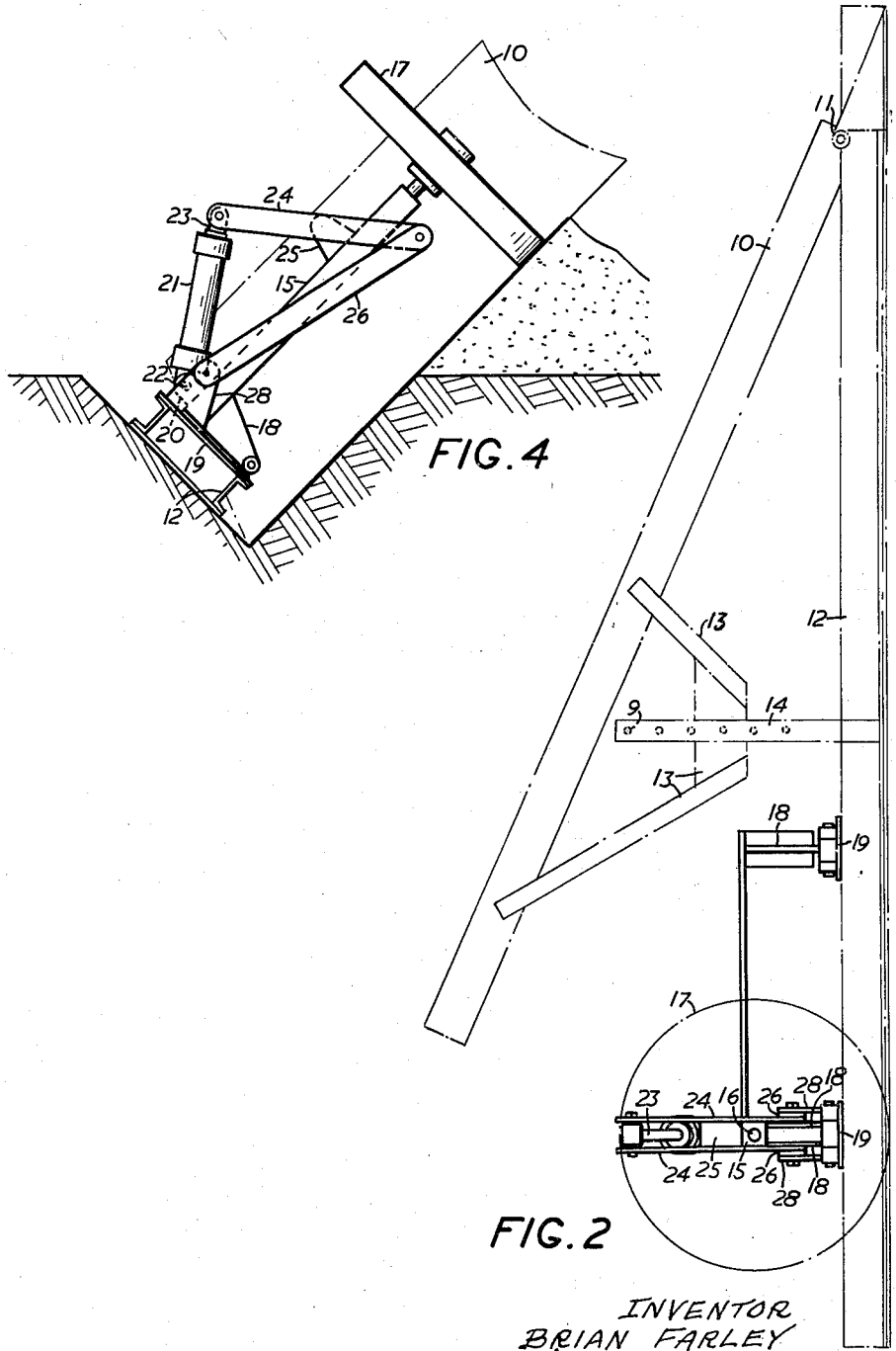
Figure 2 is a side view corresponding to Figure 1, the boss and spokes of the wheel being omitted for clearness.
Figure 4 is a diagrammatic rear view of a delver corresponding to Figure 1 but in the operative or working position thereof.

In operation, to tilt the delver from its elevated travelling position Figures 1, 2 and 3, to its working position Figure 4, the plunger rod 23 of the ram cylinder 21 is withdrawn and tends, by means of the levers 24 and links 26, to raise the axle frame 15 and the wheel 20 off the ground, whereupon the weight of the wheel 17, together with that of the frame 15 and its lever system, is sufficient to cause the delver to tilt towards the wheel 17; further withdrawal of the plunger rod 23 of the ram cylinder 21 brings the moldboard 10, down into contact with the work, see Figure 4, and the wheel 17 then may be raised further by continuing the operation of the ram plunger rod 23, to cause the wheel 17 to just clear the work thus enabling the full weight of the wheel 17 and axle frame 15 to induce a heavier cut by the moldboard 10.

To return the delver to its travelling position, Figures 1, 2 and 3, the ram plunger rod 23 is extended and the lever system 24—26, when operated thereby, forces the delver back to the upright position.

I claim:

1. A tractor drawn delver comprising a main beam, a moldboard hinged to said main beam at the front end thereof, front and rear bracket lugs secured to said main beam, front and rear hinge members pivoted to said bracket lugs, an axle frame extending from said hinge members, an axle carried by said axle frame, a wheel mounted upon the end of the axle, and means whereby the said delver may be tilted from its elevated travelling position upon its wheel to its working position with its wheel raised and returned to its elevated position when desired, said means comprising a hydraulic ram cylinder serviced from the tractor and pivotally connected to the axle frame adjacent said rear hinge member, a plunger slidable within said cylinder, and a lever system connected at one end to said plunger and having its other end in pivotal connection with the main beam of the delver, the lever fulcrum being on the axle frame.

2. A tractor drawn delver comprising a main beam, a moldboard hinged to said main beam at the front end thereof, front and rear bracket lugs secured to said main beam, front and rear hinge members pivoted to said bracket lugs, an axle frame extending from said hinge members, an axle carried by said axle frame, a wheel mounted upon the end of the axle and means whereby the said delver may be tilted from its elevated travelling position upon its wheel to its working position with its wheel raised and returned to its elevated position when desired, said means comprising a hydraulic ram cylinder serviced from the tractor and pivotally connected to the axle frame adjacent said rear hinge member, a plunger slidable within said cylinder, levers each connected at one end to said plunger and medially pivoted on a fulcrum secured to said axle frame, and connecting links connecting the other ends of said levers to respective extension members on the said rear bracket lug.

References Cited in the file of this patent

UNITED STATES PATENTS

| 2,136,911 | Briscoe | Nov. 15, 1938 |
| 2,547,680 | Wright | Apr. 3, 1951 |
| 2,649,793 | Draves | Aug. 25, 1953 |

FOREIGN PATENTS

| 159,892 | Australia | Nov. 19, 1954 |